F. L. SESSIONS & D. T. FISHER.
CABLE REELING MECHANISM FOR ELECTRIC LOCOMOTIVES.
APPLICATION FILED OCT. 6, 1909.
1,132,740.
Patented Mar. 23, 1915.
2 SHEETS—SHEET 1.
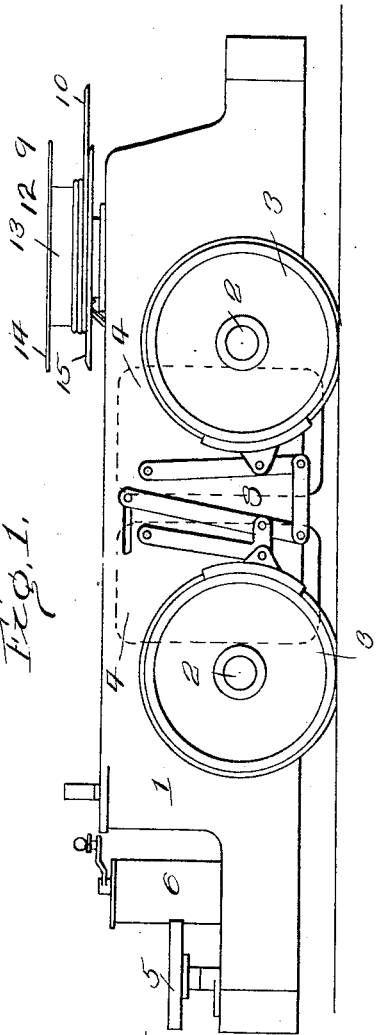
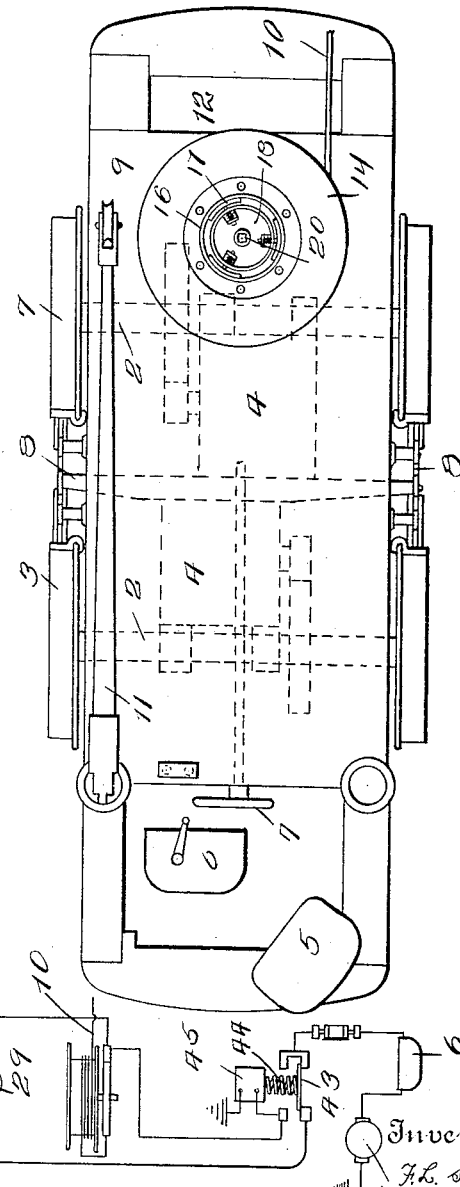

F. L. SESSIONS & D. T. FISHER.
CABLE REELING MECHANISM FOR ELECTRIC LOCOMOTIVES.
APPLICATION FILED OCT. 6, 1909.
1,132,740.
Patented Mar. 23, 1915.
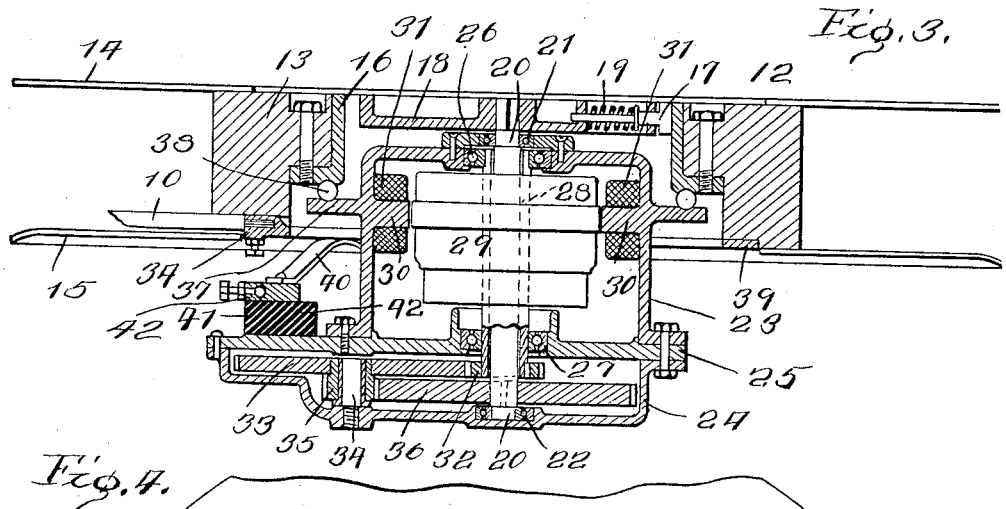
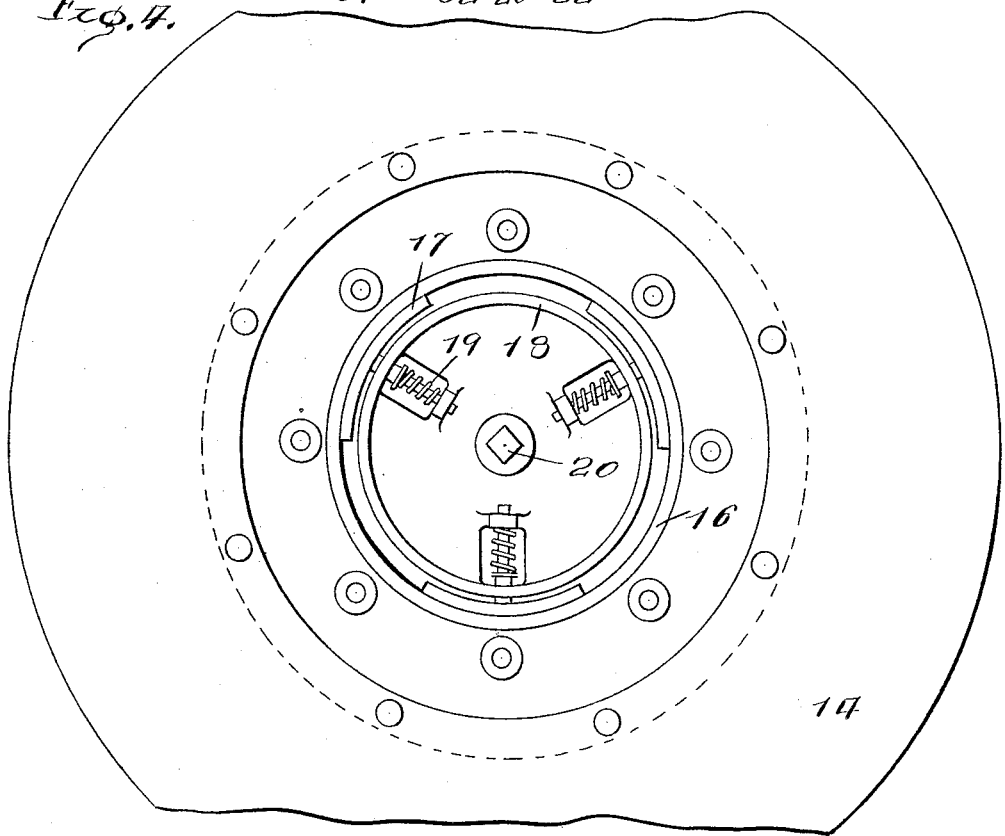

UNITED STATES PATENT OFFICE.

FRANK L. SESSIONS AND DUDLEY T. FISHER, OF COLUMBUS, OHIO, ASSIGNORS TO THE JEFFREY MANUFACTURING COMPANY, A CORPORATION OF OHIO.

CABLE-REELING MECHANISM FOR ELECTRIC LOCOMOTIVES.

1,132,740. Specification of Letters Patent. Patented Mar. 23, 1915.

Application filed October 6, 1909. Serial No. 521,398.

*To all whom it may concern:*

Be it known that we, FRANK L. SESSIONS and DUDLEY T. FISHER, both citizens of the United States, residing at Columbus, in the county of Franklin and State of Ohio, have invented certain new and useful Improvements in Cable-Reeling Mechanisms for Electric Locomotives, of which the following is a specification, reference being had therein to the accompanying drawing.

This invention relates to cable reeling mechanisms such as are employed on electric mine locomotives to wind and unwind a flexible conductor cable which brings the current from a fixed conductor, such as a trolley wire, to the motor of the locomotive. Its object is to provide an automatically acting power mechanism for controlling the winding and unwinding of the reel, which produces a comparatively uniform tension in the cable under all conditions of use.

Figure 1 of the drawings is a side view of an electric locomotive having a cable reeling mechanism embodying our invention. Fig. 2 is a plan view of the locomotive. Fig. 3 is a vertical section of the cable reeling mechanism. Fig. 4 is a plan view of the mechanism. Fig. 5 is a diagram of the electric connections of the locomotive.

The locomotive frame 1 is mounted upon the axles 2, upon which are rigidly secured the wheels 3, 3. The axles are driven by the electro motors 4, 4, which are geared respectively to the two axles. At the rear end of the locomotive is mounted the motorman's seat 5, electric controller 6 for the motors 4, 4, and the brake wheel 7 adapted to operate the brakes 8, 8. At the forward end of the locomotive there is mounted the cable reeling mechanism 9, upon which the conductor 10 is wound. Current can be conducted to the motors 4, 4 by this cable 10 or by means of the trolley pole and wheel 11, depending upon whether a trolley wire be available for contacting with the trolley wheel.

The reel 12 consists of the wooden center 13, the sheet steel flanges 14, 15 bolted thereto, and the cast iron hub ring 16, the inner face of which engages with friction shoes 17 carried by the drive disk 18 and held in engagement with the hub by means of the springs 19. The disk 18 fits upon the square ended vertical drive shaft 20, which is rotatably supported in ball bearings 21, 22 suitably mounted in the frame parts 23, 24 respectively. These frame parts are supported in any suitable manner upon the locomotive frame 1, preferably in such a position that the reel proper is located just above the top plane of the locomotive. The frame part 23 and motor head 25, which is secured thereto, constitute a motor case, and the motor head in conjunction with the frame part 24 constitute a case for the gearing to be presently described.

The motor casing supports ball bearings 26, 27, in which is mounted the quill 28 in a concentric position with respect to the drive shaft 20. This quill carries the motor armature 29, which revolves between the field poles 30 of the frame 23, these poles being energized by the coils 31. The pinion 32, which is keyed to the lower end of the quill 28 meshes with the spur gear 33, which revolves on the stud 34. The hub of the gear wheel 33 is extended axially downward and keyed with gear teeth to form the pinion 35, which is in position to mesh with the spur-gear 36 keyed upon the drive shaft 20. By this train of gearing the motor is operatively connected with the friction disk 18.

The motor frame casting 23 is formed with an integral flange 37 which constitutes the lower race of the ball bearing 38, upon which the reel is vertically supported. The collector ring 39 attached to the end face of the wooden reel center 13, is in position to slidably engage the collector brush 40, mounted on the block 41 of insulating material, which rests upon the motor head 25. The collector ring 39 is provided with the connector 34 to which the inner end of the cable 10 is electrically secured, and the brush 40 is likewise provided with a connector 42 adapted to receive the wire which leads to the circuits of the reel motor and the locomotive motors.

When the trolley wheel is in engagement with the trolley wire the switch 43 is held in position by the spring 44 to electrically connect the trolley wheel with the controller 6 and the motors 4. When the apparatus is so adjusted the conductor 10 and the reel motor 29 are out of circuit. As soon as the conductor cable 10 is connected with the source of electricity, the electro-magnet 45 is energized and the switch 43 automatically moved into position to connect the cable with the controller 6 and motors 4. By the very act of connecting the cable with the current source, the reel motor 29 is electrically energized. It is so energized as long as the conductor cable is in use and operates as a source of mechanical power to wind the reel when the locomotive is moved toward the point where the outer end of the cable is secured to the trolley wire and operates as an electro-magnetic brake to check the unwinding movements of the reel when the locomotive is going in the opposite direction. By interposing a friction drive between the motor and the reel the tension upon the cable is maintained relatively constant, both while it is being wound and while it is being unwound, irrespective of the conditions under which the motor may be operating, of variation in line voltage, of variation in the speed of the locomotive and of the direction in which the locomotive may be moving. The friction drive transmits only the power necessary to bring about the desired cable tension, and any excess of power spends itself in the greater speed of the armature, which is permitted by means of the friction connection to slip relatively to the reel.

It will be observed that the drive disk 18, and the reel 12 are fixedly mounted so as to be incapable of any movement except rotary movement. In order to effect frictional engagement between these two parts the relatively movable shoes 17 are provided. In this way we avoid the necessity for relative bodily movement between the drive element and the reel such as has been necessary in earlier devices with which we are familiar.

What we claim is—

1. In a cable reeling mechanism for an electric locomotive, the combination of an electric motor mounted with its armature axis in vertical position, a horizontal annular ball race on the frame of the motor, a cable reel provided with a central recess adapted to receive the upper part of the motor casing, balls arranged to be supported on the ball race of the motor casing, and to rotatably support the cable reel to permit it to rotate about a vertical axis coincident with the axis of the motor armature, and a power connection between the armature and the reel.

2. In a cable reeling mechanism for an electric locomotive, the combination of an electric motor provided with a hollow armature shaft, a shaft extending through the hollow armature shaft and mounted for rotation at a different speed therefrom, a cable reel mounted for rotation about an axis coincident with the axis of the armature shaft, gearing between the armature shaft and the rotatable shaft extending through it for driving the last said shaft at a speed different from that of the armature shaft, and a frictional power connection between the other end of the said rotatable shaft and the reel.

In testimony whereof we affix our signatures, in presence of two witnesses.

FRANK L. SESSIONS.
DUDLEY T. FISHER.

Witnesses:
E. L. HOPKINS,
E. P. SNIVELY.

Copies of this patent may be obtained for five cents each, by addressing the "Commissioner of Patents, Washington, D. C."